United States Patent
Vigholm

(10) Patent No.: US 7,407,034 B2
(45) Date of Patent: Aug. 5, 2008

(54) METHOD, DEVICE AND COMPUTER PROGRAM PRODUCT FOR CONTROLLING THE STEERING OF A VEHICLE

(75) Inventor: Bo Vigholm, Stora Sundby (SE)

(73) Assignee: Volvo Construction Equipment AB, Eskilstuna (SE)

( * ) Notice: Subject to any disclaimer, the term of this patent is extended or adjusted under 35 U.S.C. 154(b) by 390 days.

(21) Appl. No.: 10/906,927

(22) Filed: Mar. 13, 2005

(65) Prior Publication Data
US 2005/0139412 A1    Jun. 30, 2005

Related U.S. Application Data

(63) Continuation of application No. PCT/SE03/01206, filed on Jul. 11, 2003, now abandoned.

(30) Foreign Application Priority Data
Sep. 13, 2002    (SE)    .................................... 0202739

(51) Int. Cl.
*B62D 6/00*    (2006.01)
(52) U.S. Cl. ........................ 180/422; 701/41
(58) Field of Classification Search ............... 180/418, 180/419, 422, 423, 446; 701/41
See application file for complete search history.

(56) References Cited

U.S. PATENT DOCUMENTS

| 6,173,221 | B1 | 1/2001 | Boehringen et al. |
| 6,179,082 | B1 * | 1/2001 | Ikari ........................... 180/418 |
| 6,926,113 | B2 * | 8/2005 | Hennemann et al. ........ 180/418 |
| 6,945,351 | B2 * | 9/2005 | Fujita .......................... 180/422 |
| 2001/0004952 | A1 * | 6/2001 | Sorensen et al. ............ 180/418 |

FOREIGN PATENT DOCUMENTS

| EP | 0596167 A1 | 5/1994 |
| EP | 0722878 A1 | 7/1996 |
| SE | 407922 B | 4/1979 |
| WO | 0037300 A1 | 6/2000 |

OTHER PUBLICATIONS

International Search Report for International Patetn Application PCT/SE2003/001206, date, Sep. 16, 2003.

* cited by examiner

*Primary Examiner*—Anne Marie Boehler
(74) *Attorney, Agent, or Firm*—Novak Druce + Quigg LLP

(57) ABSTRACT

Method and device for controlling a vehicle's operation by sensing a vehicle driver's operation of a control element of the vehicle, and the steering angle of the vehicle being regulated depending on the operation of the control element. The speed of the vehicle is sensed, a procedure for changing the steering angle of the vehicle is defined based on the sensed operation of the control element and the sensed vehicle speed, and the steering angle of the vehicle is regulated according to the defined procedure.

29 Claims, 4 Drawing Sheets

METHOD, DEVICE AND COMPUTER PROGRAM PRODUCT FOR CONTROLLING THE STEERING OF A VEHICLE

CROSS-REFERENCE TO RELATED APPLICATIONS

The present application is a continuation patent application of International Application No. PCT/SE03/01206 filed 11 Jul. 2003 which was published in English pursuant to Article 21(2) of the Patent Cooperation Treaty, and which claims priority to Swedish Application No. 0202723-9 filed 13 Sep. 2002. Said applications are expressly incorporated herein by reference in their entireties.

BACKGROUND AND FIELD OF THE INVENTION

The present invention relates to a method for controlling a vehicle, operation of a control element by the driver of the vehicle being sensed, and the steering angle of the vehicle being regulated depending on the operation of the control element.

The present invention relates primarily to a working machine in the form of a wheel loader. The wheel loader comprises (includes, but is not necessarily limited to) a front and a rear body part that are interconnected in an articulated manner and each has a drive axle. The body parts are pivotable and/or rotatable relative to one another around an articulation point via two hydraulic cylinders arranged between the two parts. In this regard, the terminology "steering angle" is utilized herein to denote mutual adjustment of the two drive axles. The hydraulic cylinders are therefore arranged for steering (turning) the wheel loader.

A wheel loader usually has normal steering-wheel steering, but may in parallel be equipped with lever steering. Using the steering-wheel steering, the driver regulates mechanically a first hydraulic valve which in turn transmits hydraulic energy to the hydraulic cylinders. When lever steering is used, hydraulic energy is instead transmitted to the hydraulic cylinders via a second hydraulic valve. This second hydraulic valve, however, is controlled by electric signals so that when the lever is moved, an electric signal is generated that controls the second hydraulic valve.

When lever steering is used, the speed of change of the steering angle is controlled by the position of the lever. A large lever deflection gives a rapid change of steering angle, and a small lever deflection gives a slow change of steering angle. When the lever is guided back into the neutral position after a deflection, the steering angle which has been brought about is maintained.

The steering wheel is usually used for transport, and the lever is usually used for work at lower speeds such as, for example, loading a truck, in order to increase driver comfort. In some applications, however, the driver may prefer to use the lever for transport as well. Transport and loading are two different handling operations of the wheel loader which place very different demands on the vehicle. During a loader cycle, the wheel loader is driven forward and backward for short distances and is turned in the meantime in order to load and unload the bucket.

SUMMARY OF THE INVENTION

One object of the invention is to provide a method for controlling a vehicle which remedies problems associated with controlling the vehicle in different applications.

This object is achieved by virtue of the fact that the speed of the vehicle is sensed, that a procedure for changing the steering angle of the vehicle is defined based on the sensed operation of the control element and the sensed vehicle speed, and that the steering angle of the vehicle is regulated according to the defined procedure. In other words, in a case where the vehicle consists of a wheel loader, the wheel axles of the wheel loader are angled relative to one another in a defined way. In other words, the steering angle speed is regulated depending not only on the movement of the lever, but also on the sensed vehicle speed.

In this context, "procedure" includes, for example, the amplitude, or the amplification, of the steering angle speed.

By taking the speed of the vehicle into consideration, opportunities are afforded for making lever steering comfortable and safe. More specifically, it is possible to have different characteristics for different handling operations. During a loader cycle, long ramps are required when the steering angle speed is changed so that the machine does not have a jerky feeling. High steering angle speed is required in order that it is not necessary to stop work and wait for the steering.

During transport, when directional stability is required, the opposite is necessary, that is to say, very short ramps and low steering speed so as not to obtain oversteer and "snaking movement." In brief, it can be said that it would be advantageous at low speed to give the electric control signal high amplification and a low ramp time in order to obtain a large but gentle steering deflection, and at high speed to give the electric control signal low amplification and short ramp time in order to obtain a small but rapid-response steering deflection.

According to a preferred embodiment of the invention, the speed of change of the steering angle is defined as a function of the sensed vehicle speed. The signal from the lever is therefore amplified (or attenuated) to a different extent depending on the vehicle speed.

According to one variation (development) of the invention, the speed of change of the steering angle is defined by an inverse relationship relative to the sensed vehicle speed. In other words, the change of steering angle for a specific lever deflection takes place more rapidly at lower vehicle speeds than at higher vehicle speeds.

According to another preferred embodiment of the invention, the steering angle speed is changed with time for at least a first predetermined speed range. In other words, use is made of what is known as a ramp or, more generally speaking, an escalation (i.e., an increase in value or magnitude with increase in time).

The escalation may be of different types, for example linear, progressive, regressive (degressive) or step-shaped.

According to a preferred example, the change of the steering angle speed is increased proportionally with time over the first speed range.

According to another preferred embodiment of the invention, the steering angle speed is changed directly corresponding to the movement of the control element for at least a second predetermined speed range. The expression "direct control" should be taken to mean a method which may correspond to mechanical-hydraulic transmission without electric control. In other words, the signal from the lever is not manipulated in connection with changing the steering angle speed. On the other hand, the amplitude of the signal can be amplified or attenuated.

The first predetermined speed range is preferably lower than the second predetermined speed range.

This first speed range is preferably a lower speed range, corresponding to loading mode, for example from 0 km/h to 10 km/h, and the second speed range is preferably a higher speed range, corresponding to transport mode, for example from 10 km/h upward.

Another object of the invention is to produce a device for controlling a vehicle that remedies problems associated with controlling the vehicle in different applications.

Further preferred embodiments and advantages of the invention emerge from the balance of the application, including the description provided herein.

BRIEF DESCRIPTION OF THE DRAWINGS

The invention will be described in greater detail below, with reference to the embodiment shown in the accompanying drawings, in which.

DETAILED DESCRIPTION

Figure 1:
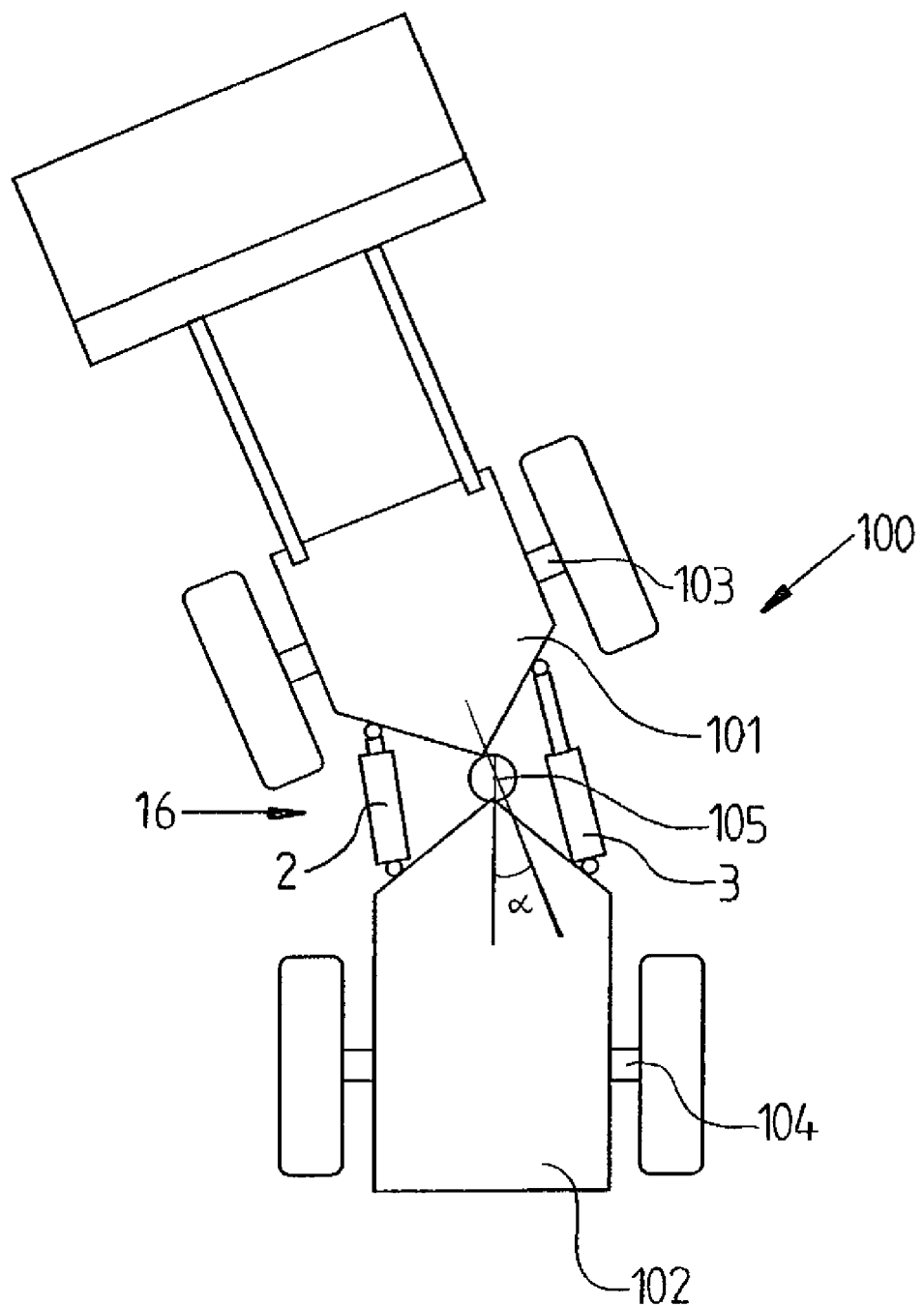
FIG. 1 is a diagrammatic view, taken from above, of a wheel loader.

FIG. 1 shows a diagrammatic view taken from above of a heavy duty vehicle in the form of a wheel loader 100. The wheel loader 100 comprises a front and a rear part 101, 102 that each have a wheel axle 103, 104. The vehicle parts 101, 102 are interconnected in an articulated manner and the parts are rotatable relative to one another around an articulation (point, joint or connection) 105 via means 16 for turning the vehicle. In the exemplary embodiment, the turning means 16 comprise two hydraulic cylinders 2, 3 arranged between the front and rear parts. In FIG. 1, the vehicle parts are rotated by an angle a relative to one another.

Figure 2:
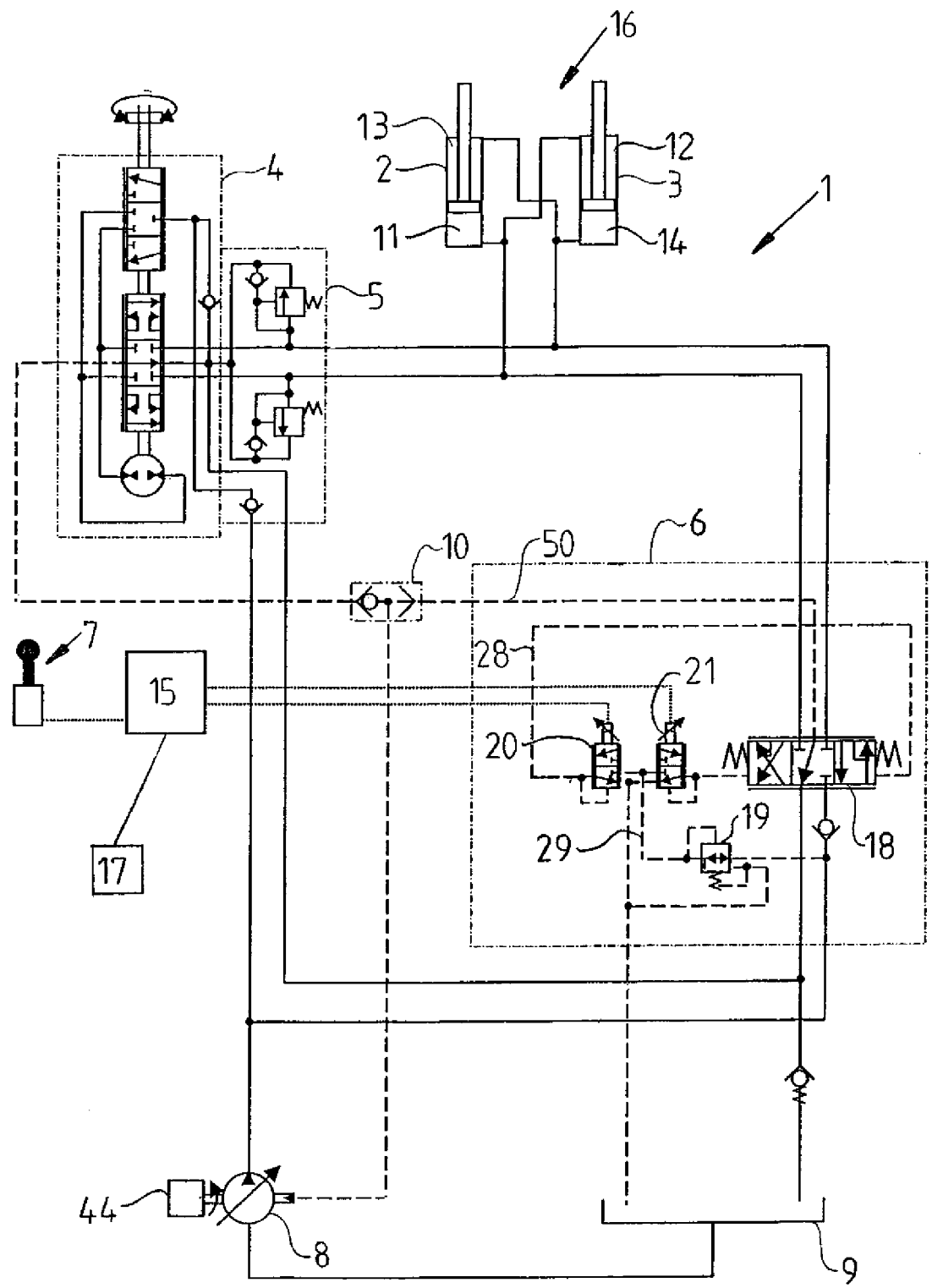
FIG. 2 is a schematic representation of an exemplary device used for controlling a vehicle according to the present invention.

FIG. 2 shows a device 1 for regulating the two hydraulic cylinders 2, 3 of the wheel loader 100. The lines marked by solid lines indicate main lines, and the lines marked by dashed lines indicate pilot lines for regulating various components in the system.

The system comprises a first control valve 4 that is regulated mechanically by the steering wheel of the vehicle. The system also comprises a second control valve 6 that is controlled electronically via a control element 7 in the form of a lever or a joystick.

Control via the lever 7 is shown diagrammatically by dotted lines.

The system is load-sensing (LS) and comprises a variable displacement pump 8 and a tank 9. The pump 8 is driven by the propulsion engine 44 of the vehicle, in the form of a diesel engine. The pump 8 senses the pressure (an LS signal) from the steering cylinders 2, 3 via a shuttle valve 10 and via the control valve 4, 6 which is activated. The pump then sets a pressure which is a certain number of bars higher than the pressure of the steering cylinders. This brings about an oil flow out to the steering cylinders 2, 3, the level of which depends on the extent to which the activated control valve 4, 6 is operated.

The hydraulic cylinders 2, 3 are adapted in such a way that the piston side 11 of the first hydraulic cylinder 2 and the piston-rod side 12 of the second hydraulic cylinder 3 are connected to the pump 8 for steering the vehicle to the right. The piston-rod side 13 of the first hydraulic cylinder 2 and the piston side 14 of the second hydraulic cylinder 3 are connected to the pump for steering the vehicle to the left.

The connection of the hydraulic cylinders 2, 3 to the pump 8, and thus the regulation of the hydraulic cylinders can be carried out either via steering-wheel steering by means of the control valve 4 or via lever steering by means of the control valve 6.

The design and function of the first control valve 4 are previously known and are therefore not described in detail.

The second control valve 6 comprises a directional valve 18 which determines the steering direction and also the control flow. A pressure-reducing valve 19 is included which ensures that the pilot pressure is limited to a defined level, irrespective of the pump pressure. The control valve 6 also comprises two electrically controlled valves 20, 21 which are regulated indirectly via an electric signal from the lever 7. The electrically controlled valves 20, 21 are arranged in parallel with one another on a line 28. The line 28 is also connected to the directional valve 18 on both its sides for movement thereof counter to spring force. The pump 8 is connected to the electric valves 20, 21 via a line 29 which is connected to the line 28 between the electric valves. The result of this is that activation of the right-hand valve 21, via the lever 7, produces an oil pressure on the directional valve 18 for movement of the latter to the right in the figure counter to a spring force, and activation of the left-hand valve 20, via the lever 7, produces an oil pressure on the directional valve 18 for movement of the latter to the left in the figure counter to a spring force.

For steering to the right, the electrically controlled right-hand valve 21 is therefore activated, which then applies an oil pressure proportional to the electric signal to the directional valve 18. The higher the electric signal (oil pressure), the more the directional valve 18 is operated, the greater the control flow that is obtained. For steering to the left, the electrically controlled left-hand valve 20 is therefore activated in a corresponding way.

When the control valve 6 is not activated, the LS signal is connected from the shuttle valve 10 (see line 50) to the tank 9 via the directional valve 18 and is thus in principle pressureless. The same applies for the first control valve 4, which also connects the LS signal to the tank 9 when it is not activated. The pump 8 is thus adjusted down and maintains only a low pressure. The two electrically controlled valves 20, 21 are therefore arranged in such a way that activation of one valve results in movement of the directional valve 18 in one direction, and activation of the other valve results in movement of the directional valve 18 in the other direction.

In order to prevent negative pressures and pressures exceeding a defined maximum pressure in the system, the system comprises a top-up valve and a choke valve which are indicated together by reference number 5. The function of the top-up valve and the choke valve is previously known and will therefore not be described in detail here.

The device 1 also comprises a control unit 15 connected to the lever 7. The control unit 15 may also be called, for example, a computer unit or CPU (Control Power Unit). By means of the control unit 15, the control valve 6 is regulated by an electric signal. The control unit 15 is therefore connected to the hydraulic cylinders 2, 3 via the control valve 6.

The device also comprises a system 17 for sensing the speed of the vehicle. The sensing system comprises, for example, one or more sensors for sensing the speed of rotation of a rotating part in the transmission of the vehicle. This is known, per se, and will therefore not be described in greater detail. This sensing system 17 is connected to the control unit 15.

The control unit 15 is adapted to define the steering angle speed as a function of the sensed vehicle speed.

The signal of the lever 7 can therefore be manipulated in the control unit 15. The control unit 15 has the machine speed and the lever position as input signals and can, for example, define extreme values for the steering deflection and ramps in order to achieve the steering deflection. According to a preferred embodiment, the size of the ramps is a function of the machine speed. If appropriate, the deflection limit, that is to say a maximum permitted steering deflection, can also be a function of the machine speed.

The steering angle value is therefore defined in time order after the sensing of the movement of the control lever.

Figure 3:
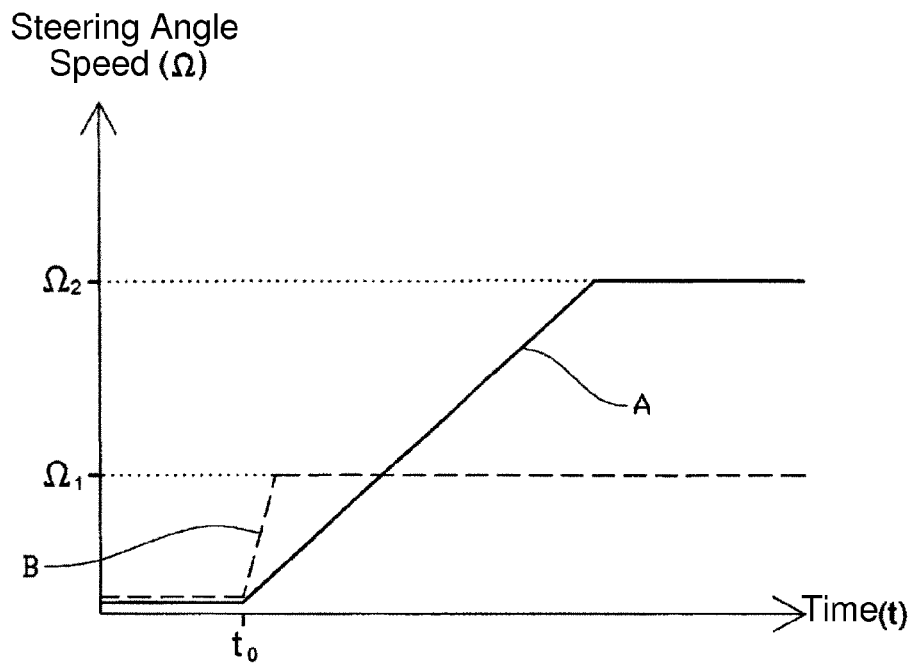
FIGS. 3 and 4 are graphs showing different examples of ramps for steering angle speed regulation.

FIG. 3 shows two curves, or ramps A, B for regulating the steering angle speed as a function of time. Ramp A is used for low vehicle speed and ramp B for high vehicle speed. Ramp A has a large amplification (high final steering angle speed) and a long ramp time. This means that a certain lever deflection gives a relatively great steering deflection which feels relatively gentle for the driver. Ramp B has a low amplification (low final steering angle speed) and a short ramp time. This means that the lever deflection gives a steering deflection that corresponds to the lever movement and which takes place quickly; that is to say, a short delay. Ramps A and B are linear; that is to say, the steering angle speed is increased proportionally with increased time to a maximum value.

Figure 4:
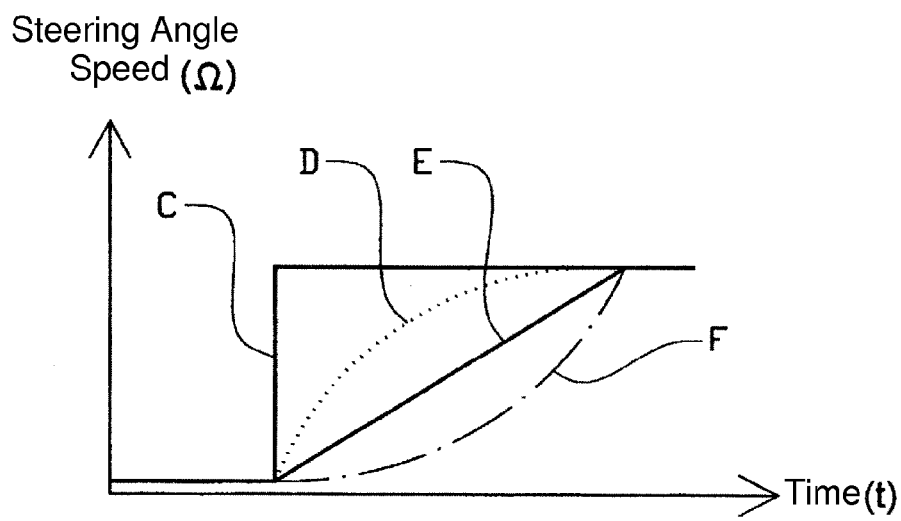

FIG. 4 shows various examples of characteristics of ramps for changing the steering angle speed, namely step-shaped C, regressive (degressive) D, linear E and progressive F. The rise time can be changed proportionally to the vehicle speed, for example.

According to a preferred example, use is made of a step-shaped ramp at high speeds and a linear ramp at low speeds.

The computer unit of the vehicle comprises a memory that in turn comprises a computer program product with computer program segments, or a program code, for performing all the steps according to the control method when the program is run. The computer program product can be the actual software for carrying out the method, or hardware on which the software is stored, such as a disk or the like.

The speed of the vehicle means speed in the longitudinal direction of the vehicle, including both forward and backward.

The above can also be applied to control apparatus which do not have a linear movement pattern, such as an angular control apparatus (for example a steering wheel or crank) with sensors, or electric transducers, which function in a similar way to the described lever.

Figure 5:
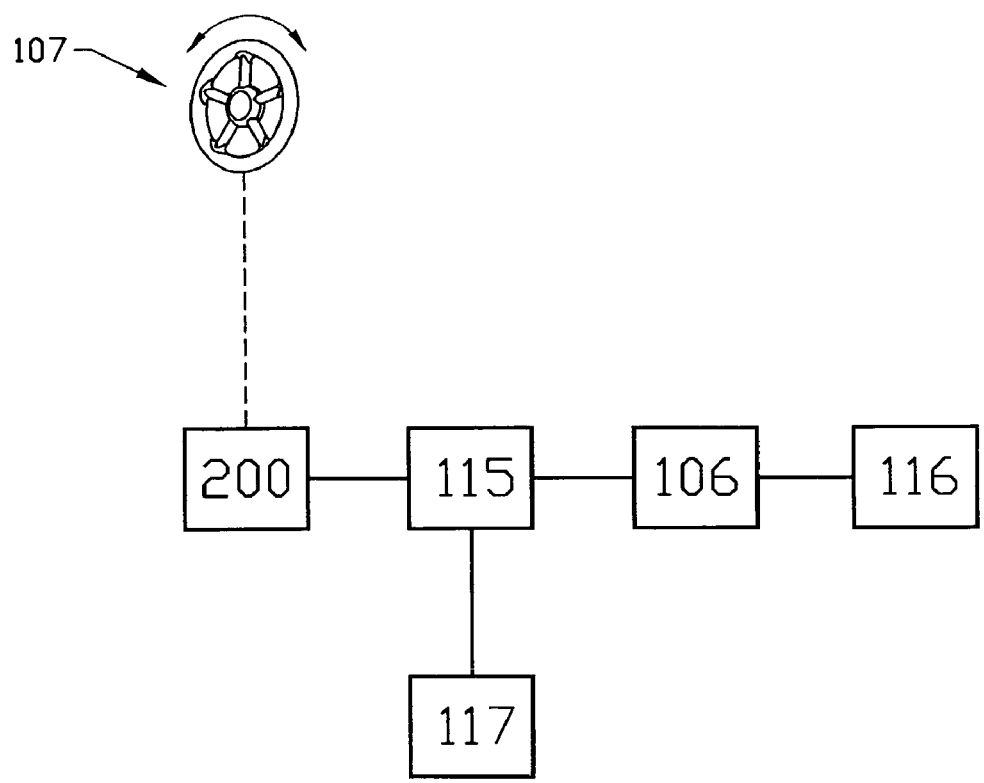
FIG. 5 is a diagrammatic view showing an alternative device for controlling the vehicle.

FIG. 5 illustrates diagrammatically such an embodiment where the control element consists of a steering wheel 107. The movements of the steering wheel 107 are detected by one or more sensor(s) 200 connected to a control unit 115. A system 117 for sensing the speed of the vehicle is also connected to the control unit 115. A second control valve 106 is controlled electronically from the control unit 115. The second control valve 106 in turn performs regulatory functions in the way described above with respect to the turning means 116 that takes the form of the two hydraulic steering cylinders 2, 3 arranged between the two vehicle parts.

According to one alternative, the sensors 200 measure angular positions and the control unit 115 comprises a time counter by means of which the control unit can convert the angular positions measured into a steering wheel speed.

According to another alternative, the steering wheel speed is sensed directly, for example via a pulse meter connected to the control unit 115. The steering angle speed, that is to say the speed at which the steering angle of the vehicle is changed, is then controlled depending on the steering wheel speed.

It is therefore possible to apply the examples described above for lever steering for steering-wheel steering as well. A certain steering wheel speed can therefore correspond to a certain speed of change of steering angle within a certain vehicle speed range.

The same steering wheel speed can then correspond to a lower speed of change of steering angle within a second, higher vehicle speed range. In a corresponding way, it is possible, for example, for the ramps according to FIGS. 3 and 4 to be used in order to achieve different changes of steering angle speed.

The embodiment for electronic lever steering according to FIG. 2 can of course be combined with the embodiment for electronic steering-wheel steering according to FIG. 5.

The invention is not to be regarded as being limited to the illustrative embodiments described above, but a number of further variants and modifications are conceivable within the scope of the following patent claims. The invention can also, for example be applied to vehicles other than wheel loaders, such as an articulated or frame-steered vehicle, also known as a dumper.

What is claimed is:

1. A method for controlling a vehicle, comprising:
sensing the operation of a control element (7) by the driver of the vehicle and the steering angle of the vehicle being regulated in dependence thereupon;
sensing the speed of the vehicle and defining a procedure for changing the steering angle of the vehicle based on the sensed operation of the control element and the sensed vehicle speed; and
regulating the steering angle of the vehicle according to the defined procedure so that the speed of change of the steering angle is defined as a function of the sensed vehicle speed; the speed of change of the steering angle is defined in an inverse relationship relative to the sensed vehicle speed; the procedure comprises an escalation at its start in order to reach a defined speed of change of the steering angle; and the escalation is shorter in terms of time for a sensed vehicle speed within a higher vehicle speed range than within a lower vehicle speed range.

2. The method as recited in claim 1, wherein the position of the control element (7) is sensed and wherein the procedure for changing the steering angle of the vehicle is defined directly based on the sensed position of the control element (7).

3. The method as recited in claim 1, wherein the control element (7) is a steering wheel (107) and the speed with which the steering wheel (107) is regulated is determined and the procedure for changing the steering angle of the vehicle is defined based on the determined speed of the steering wheel (107).

4. The method as recited in claim 1, wherein the escalation profile is different for at least two different vehicle speed ranges.

5. The method as recited in claim 1, wherein the steering angle speed is changed with time for at least a first predetermined speed range.

6. The method as recited in claim 5, wherein the first predetermined speed range is lower than the second predetermined speed range.

7. The method as recited in claim 1, wherein the change of the steering angle speed is increased proportionally with time over said first speed range.

8. The method as recited in claim 1, wherein the steering angle speed is changed directly corresponding to the movement of the control element for at least a second predetermined speed range.

9. The method as recited in claim 1, further comprising regulating the position of a directional valve (18) to bring about regulation of the steering angle of the vehicle, the directional valve being adapted for regulating the supply of a fluid from a pump (8) to turning arrangements (16, 116, 2, 3) for turning the vehicle.

10. The method as recited in claim 1, wherein the steering angle of the vehicle is regulated via a system of at least one hydraulic cylinder (2, 3).

11. The method as recited in claim 10, wherein the hydraulic cylinder system is arranged between a front and a rear body part (101, 102) of the vehicle, said body parts each comprising at least one wheel axle (103, 104) and each being rotatably arranged relative to one another.

12. The method as recited in claim 1, wherein the vehicle is a working machine.

13. The method as recited in claim 1, wherein the vehicle is a wheel loader.

14. A device for controlling a vehicle (100), said device comprising:
    a control element (7, 107) configured for operation by the driver of the vehicle;
    turning means (16, 116, 2, 3) for turning the vehicle;
    a control unit (15, 115) connected to the control element and said turning means for regulating the steering angle of the vehicle depending on the operation of the control element; and
    a system (17, 117) for sensing the speed of the vehicle and the control unit (15, 115) being connected to the sensing system and the control unit being adapted to define a procedure for changing the steering angle of the vehicle based on the sensed operation of the control element and the sensed vehicle speed and to cause said turning means (16, 116, 2, 3) to regulate the steering angle of the vehicle according to the defined procedure;
    wherein the control unit (15) is configured to define the speed of change of the steering angle as a function of the sensed vehicle speed, the control unit (15) being adapted to define the speed of change of the steering angle in an inverse relationship relative to the sensed vehicle speed and the control unit (15, 115) being adapted to use an escalation (A, B, C, D, E) at the start of the procedure in order to reach a defined speed of change of the steering angle, and the escalation (A, B, C, D, E) being shorter in terms of time for a sensed vehicle speed within a higher vehicle speed range than within a lower vehicle speed range.

15. The control device as recited in claim 14, further comprising: a sensor configured to sense the position of the control element (7) and the control unit (15) being adapted to define the procedure for changing the steering angle of the vehicle directly based on the sensed position of the control element (7).

16. The control device as recited in claim 14, further comprising: a sensor that determines the speed with which the control element (107) is regulated and the control unit (115) being adapted to define the procedure for changing the steering angle of the vehicle based on the determined speed of the control element (107).

17. The control device as recited in claim 14, wherein the escalation (A, B, C, D, E) is of different length in terms of time for different vehicle speed ranges.

18. The control device as recited in claim 14, wherein the control unit (15) is configured to change the steering angle speed with time for at least a first predetermined speed range.

19. The control device as recited in claim 18, wherein the first predetermined speed range is lower than the second predetermined speed range.

20. The control device as recited in claim 14, wherein the control unit (15) is configured to increase the change of the steering angle speed proportionally with time over said first speed range.

21. The control device as recited in claim 14, wherein the control unit (15) is configured to change the steering angle speed directly corresponding to the movement of the control element for at least a second predetermined speed range.

22. The control device as recited in claim 14, wherein the control device comprises a directional valve (18) configured to regulate the supply of a fluid from a pump (8) to said turning means (16, 116, 2, 3) and the control unit (15) is connected to the directional valve for regulating its position for the purpose of regulating the steering angle of the vehicle.

23. The control device as recited in claim 14, wherein the turning means (16, 116) comprises a system of at least one hydraulic cylinder (2, 3) for changing the steering angle.

24. The control device as recited in claim 23, wherein the system of at least one hydraulic cylinder (2, 3) is arranged between a front and a rear body part (101, 102) of the vehicle, said body parts each comprising at least one wheel axle (103, 104) and said body parts (101, 102) being rotatably arranged relative to one another.

25. The control device as recited in claim 14, wherein the control element (7) consists of a control lever.

26. The control device as recited in claim 14, wherein the control element (7) consists of an element intended for rotation.

27. The control device as recited in claim 14, wherein said control device is installed on a working machine.

28. The control device as recited in claim 14, wherein said control device is installed on a wheel loader.

29. The control device as recited in claim 14, further comprising a computer program product including computer program segments for controlling the vehicle according to a method comprising:
    sensing the operation of a control element (7) by the driver of the vehicle and the steering angle of the vehicle being regulated in dependence thereupon;
    sensing the speed of the vehicle and defining a procedure for changing the steering angle of the vehicle based on the sensed operation of the control element and the sensed vehicle speed; and
    regulating the steering angle of the vehicle according to the defined procedure so that the speed of change of the steering angle is defined as a function of the sensed vehicle speed; that the speed of change of the steering angle is defined in an inverse relationship relative to the sensed vehicle speed; the procedure comprises an escalation at its start in order to reach a defined speed of change of the steering angle; and the ramp is shorter in terms of time for a sensed vehicle speed within a higher vehicle speed range than within a lower vehicle speed range.

* * * * *